Patented Jan. 23, 1940

2,188,057

UNITED STATES PATENT OFFICE 2,188,057

PROCESS FOR CATALYTIC CONVERSION OF GASEOUS HYDROCARBONS

Boris Malishev, Elizabeth, N. J., assignor of thirty and one-third per cent to Universal Development Corporation, New York, N. Y., and three per cent to John P. Nikonow, New York, N. Y.

No Drawing. Application January 24, 1939, Serial No. 252,546

4 Claims. (Cl. 196—10)

My invention relates to catalytic reactions of hydrocarbons and has particular reference to polymerization of olefinic gases into liquid hydrocarbons.

This application is a continuation-in-part of my application Serial No. 194,796, filed March 9, 1938, which matured into Patent No. 2,148,634; and Serial No. 205,724, filed May 3, 1938, which matured into Patent. No. 2,148,378.

In the process of cracking hydrocarbon oils such as are used for obtaining an increased yield of gasoline and similar light hydrocarbons, a more or less large amount of gases, uncondensable at normal temperature and pressure, are formed consisting of hydrogen, saturated hydrocarbons, and olefins. These gases containing sometime as much as 50% olefins cannot be used economically for any practical purposes and are usually largely wasted. To prevent such a waste, methods have been developed for polymerization of the olefinic component of these gases, one of such methods involving the use of a catalyst comprising phosphoric acid calcined with adsorbent materials such as kieselguhr. I have found, however, that an effective polymerization can be obtained with the use of my catalyst representing a calcined mixture of a mineral phosphate or Thomas slag, (including, of course, such modified forms of the mineral phosphates as superphosphates, etc.), with sulfuric acid (including sulfuric acid anhydride, sludge acid, etc.), the calcination being conducted at a temperature sufficient to largely expel the sulfuric acid but below red heat. The preparation of my catalyst was fully described in my United States patent applications Serial Serial No. 140,441, filed May 3, 1937; 194,769, filed March 9, 1938; and 205,724, filed May 3, 1938, this application being continuation in part of the application No. 140,441. I have found that my catalyst is suitable for polymerization or synthesis of hydrocarbons, especially normally gaseous olefines into gasoline-like products; for treating petroleum and coal tar products; for refining gasoline and improving its anti-knock properties; for alkylating aromatic hydrocarbons with olefines, and for various other purposes when catalytic conversion may be used.

The olefinic gases from cracking oils in gasoline manufacture contain a considerable amount of paraffin hydrocarbons, which are exceedingly stable and do not react at the temperature at which the olefins are catalytically polymerized. It is known that normally gaseous paraffins can be converted into the more reactive olefins by cracking; but this requires a very high temperature of about 750° C. and gives a poor conversion as a considerable amount of hydrocarbons is decomposed into carbon. Now I have found that with my catalyst, the paraffinic gases can be cracked at relatively low temperature such as 400–450° C. and converted with a good yield to olefins whereby very little carbon is formed.

I polymerize by a two step process a mixture of olefinic and paraffinic gases such as are obtained from cracking. In the first step, the mixture of gases is heated over my catalyst at 400–450° C. whereby the paraffinic gases are converted into olefins. In the second step, the obtained olefinic product is polymerized with my catalyst to gasoline at a temperature of 200–250° C. and a pressure of between 7 to 15 atmospheres.

*Example 1.*—A mixture of normally gaseous hydrocarbons, such as is obtained in a cracking process and containing ethylene, propylene, and butylene was passed through my catalytic mass downwardly at a temperature of 200° C. and at a pressure of 10 atmospheres. In this manner about 75% of the olefinic gases were converted into a gasoline of good quality, having an octane number of 82.

*Example 2.*—A cracked unrefined gasoline of yellow color, poor induction period (=2 hours) and high copper dish gum (600 mg per 100 cc.) was pumped through a bed of my catalyst at 225° C. and at 200 pounds pressure. The product was redistilled to the desired endpoint. The gasoline thus refined had a Saybolt color of 30+, a copper dish gum of 10 mg per 10 cc. and an induction period of 10 hours. The anti-knock rating rose from 67 to 70 octane.

*Example 3.*—An unrefined cracked gasoline was pumped through my catalytic mass at a temperature between 200–300° C. and a pressure sufficient to substantially maintain the liquid state. Olefins containing gas such as is obtained in cracking were added to the hot gasoline in quantities so as to form a mixture of gas and liquid. The product obtained was redistilled to the desirable endpoint and yielded more gasoline than in a process without using cracked gases. The gasoline obtained was completely refined and with a higher octane number than in a process without using cracked gases. The olefins were apparently polymerized and condensed with aromatics.

*Example 4.*—Benzene was pumped through my catalytic mass while ethylene was forced through it at a pressure of 450 pounds per square inch, in countercurrent to the benzene. A temperature of 250° C. was maintained in the reaction chamber. The resultant liquid was fractionated for separating ethyl benzene from the unreacted benzene. Ethylization was 60% complete.

Example 5.—Ethylene at the initial pressure of 700 pounds per square inch was heated in an autoclave for eight hours at 340° C. with my catalyst. About 20% of the ethylene was polymerized by this method into gasoline. The higher boiling constituents of the polymer contained kerosene, Diesel oil, and lubricating oils.

I claim as my invention:

1. A process for the polymerization of gaseous products resulting from a hydrocarbon oil cracking process, comprising subjecting the gaseous products to the action of a catalyst consisting of a product of a mixture of a substance taken from the group consisting of a mineral phosphate, superphosphate, and Thomas slag, with a substance taken from the group consisting of sulfuric acid and sludge acid, calcined at a temperature sufficient to largely expel the free sulfuric acid but below red heat, the treatment being conducted at such pressure and temperature conditions as to polymerize the gaseous product into liquid hydrocarbons.

2. A process for the polymerization of gaseous products resulting from a hydrocarbon oil cracking process, comprising subjecting the gaseous products at a temperature from 200 to 250° C. and at a pressure of 7 to 15 atmospheres to the action of a catalyst consisting of a product of a mixture of a substance taken from the group consisting of a mineral phosphate, superphosphate, and Thomas slag with a substance taken from the group consisting of sulfuric acid and sludge acid, calcined at a temperature sufficient to largely expel the free sulfuric acid but below red heat.

3. A process for the polymerization of a mixture of olefinic and paraffinic gases, consisting in heating said mixture in presence of a catalyst representing a product of a mixture of a substance taken from the group consisting of a mineral phosphate, superphosphate, and Thomas slag, with a substance taken from the group consisting of sulfuric acid and sludge acid, calcined at a temperature below red heat until the free sulfuric acid is largely expelled, the heating of the gaseous mixture being conducted at the temperature from about 400 to 450° C. until the paraffinic gases are converted into olefinic gases, and polymerizing the olefinic gases in presence of said catalyst at such temperature and pressure conditions as to polymerize the gaseous products into liquid hydrocarbons.

4. A step in the process of polymerization of a mixture of olefinic and paraffinic gases obtained during cracking process of petroleum oils, consisting in converting paraffinic gases into olefinic gases by heating the mixture of said gases at a temperature of about 400 to 450° C. in presence of a catalyst comprising a product of a mixture of a substance taken from the group consisting of a mineral phosphate, superphosphate, and Thomas slag, with a substance taken from the group consisting of sulfuric acid and sludge acid, calcined at a temperature below red heat until the free sulfuric acid is largely expelled.

BORIS MALISHEV.